United States Patent [19]

Neale, Jr.

[11] Patent Number: 4,757,301

[45] Date of Patent: Jul. 12, 1988

[54] LIGHT PREWARNING SYSTEM FOR DIESEL VEHICLES

[76] Inventor: Morris Neale, Jr., 6119 Crain Hwy., Upper Marlboro, Md. 20772

[21] Appl. No.: 767,804

[22] Filed: Aug. 21, 1985

[51] Int. Cl.[4] .............................................. B60Q 1/26
[52] U.S. Cl. ...................................... 340/71; 340/66; 340/94
[58] Field of Search ................... 340/66, 71, 52 B, 93, 340/94, 52 R, 69, 72, 84, 107; 192/3 R, 3 M, 35; 180/282; 123/320, 349, 350, 371, 319, 41.15, 351, 198 D

[56] References Cited

U.S. PATENT DOCUMENTS 3,375,496  3/1968  Antunovic ........................... 340/66
4,223,649  9/1980  Robinson et al. ................... 123/319
4,651,129  3/1987  Wood et al. .......................... 340/71
4,667,177  5/1987  Athalye ................................ 340/66

FOREIGN PATENT DOCUMENTS 3124899  1/1983  Fed. Rep. of Germany ........ 340/66

Primary Examiner—Donnie L. Crosland
Assistant Examiner—Brent A. Swarthout
Attorney, Agent, or Firm—Armstrong, Nikaido, Marmelstein & Kubovcik

[57] ABSTRACT

The engine brake warning system is connected directly to the rear of a truck, bus or trailer in the general area of the conventional brake lights. The lights are hard-wired to the engine brake housings to activate according to selected phases of engine braking from the three position switch operated by the driver of the vehicle.

3 Claims, 1 Drawing Sheet

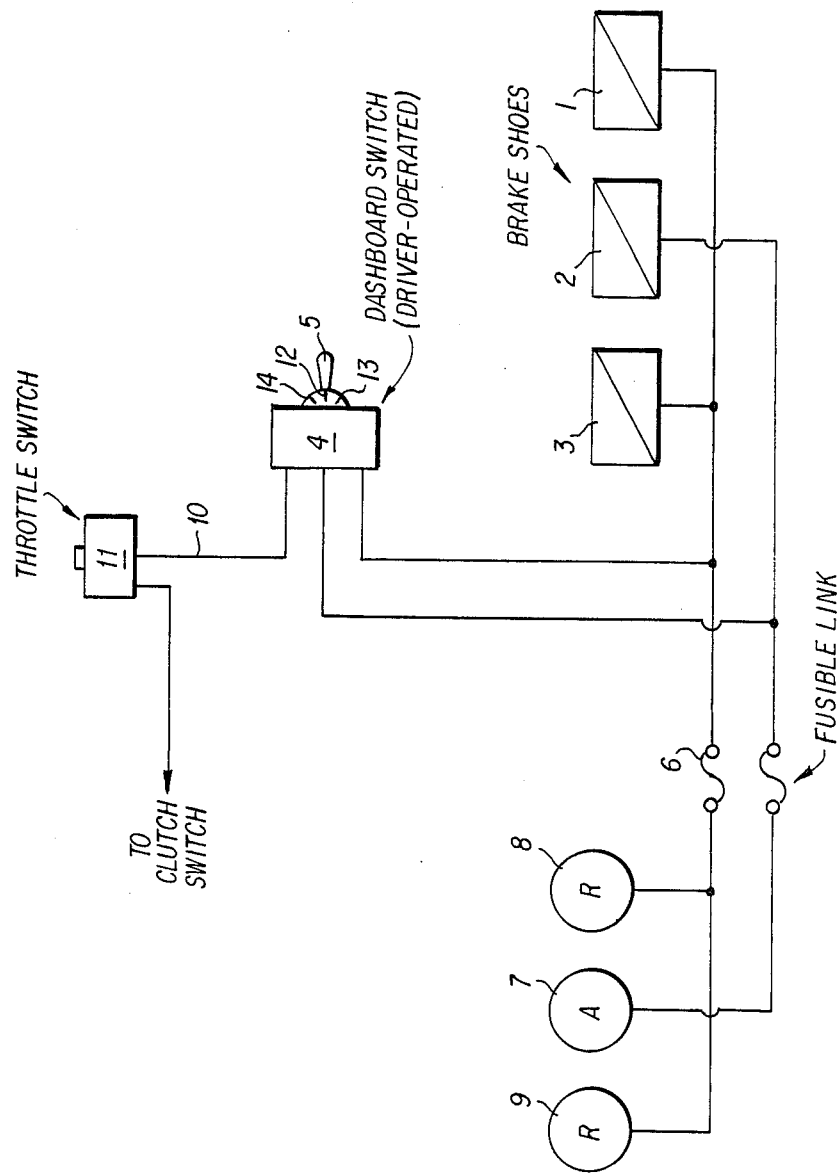

LIGHT PREWARNING SYSTEM FOR DIESEL VEHICLES

BACKGROUND OF THE INVENTION

This invention relates to an improved visual warning light system that can be bolted on the back of a large truck that is powered by a diesel engine equipped with an engine retarder, exhaust brake or a hydrodynamic fluid retarder.

The most popular retarder device used on large trucks is the engine brake. The operation of an engine brake is simply stated by activating the engine brake housings on top of he motor with electric current from the battery of the vehicle which effectively converts a power producing diesel engine into a power absorbing air compressor, causing the vehicle to decelerate.

The engine brake has a highly recommended safety feature because it allows the driver to decelerate the truck without using the conventional air brakes, therefore, no signal of deceleration is indicated to following motorist during the vehicle's engine braking. This can lead to motorist (not to mention other trucks) following too close, resulting in rear end collisions.

SUMMARY OF THE INVENTION

It is therefore, the primary purpose of this invention to provide such a prewarning system which, as a separate unit, can be installed on the back of a truck, tractor and trailer or bus. This add-on warning system which installed on a vehicle equipped with an engine brake will insure greater safety on the highway for all motorists following the vehicle.

BRIEF DESCRIPTION OF THE DRAWINGS

The FIGURE is a diagram of the present invention.

BRIEF DESCRIPTION OF THE PREFERRED EMBODIMENTS

In general, this invention is provided by having two red lights with one amber light in between which may be embodied in a metal panel. This panel is bolted directly to the rear of a truck along the location of the regular brake lights.

The invention has one wire connected to the front and rear engine brake housing on top of the diesel motor while at the other end the wire is connected to the two red lights on the metal panel with a fusible link 6 in between. The system has another wire connected to the center brake housing on top of the motor while the other end of the wire is connected to one amber light on the metal panel with a fusible link 6 in between. When the switch 5 is on the low 13 setting, the amber light will signal minimum deceleration to the following motorist. When the three position switch 4 on the medium 12 setting, the two red lights will signal the increasing degree of engine braking. When the three position switch 4 is on the high 14 setting, the amber and both red lights will light to signal maximum engine braking to the following motorist.

A preferred embodiment of this invention is shown by way of example in the accompanying drawings and is hereinafter described in detail without attempting to show all the various forms and modifications in which this invention might be embodied, the invention being measured by the appended claims and not the details of the specification.

The engine brake is a conventional wired system. This invention is an add-on to the conventional wiring starting at the engine brake housings.

Referring to the drawing in detail, 1, 2, and 3 represent the engine brake housings on top of a diesel motor.

Electric current comes from the vehicles battery through a wire to the ignition switch (not shown). When the ignition switch is on, electrical current passes through a wire to the ON-OFF switch or throttle switch 11 located on the dashboard of the vehicle. When the ON-OFF switch 11 is turned to the ON position, current passes through a wire 10 to send current to the three position switch 4 (also located on the dashboard) to activate the engine brakes. If the low 13 setting of the three position switch 4 is selected, current passes through a wire sending electric current to the center brake housing activating the center engine brake.

This invention begins with the wire which is connected to the center brake housing, therefore when the current activates the center engine brake, the current passes through the fusible link 6 to activate the AMBER light 7 to signal the minimum stage of engine braking to any motorist following the vehicle.

If the medium 12 setting of the three position switch 4 is selected, the current then activates the front and rear brake housings (1, 3). Therefore the wire is connected to the front and rear housings sending current through the fusible link 6 to activate the RED lights 9 and 8 to signal the increased stage of engine braking to the motorist following the vehicle.

When the high 14 setting of the three position switch 4 is selected, current goes through the wires activating all engine brake housings 1, 2 and 3. Therefore current is sent through the wires to activate the RED 9, AMBER 7 and RED 8 lights during engine braking to signal maximum engine braking to any motorist following the vehicle.

Having described the invention what is claimed is:

1. A warning light system to indicate slowing down of a diesel powered vehicle, the vehicle including an engine, a plurality of engine brakes connected to said engine, wheel brakes, wheel brake lights, wheel brake pedal to activate said wheel brakes and said wheel brake lights when depressed to brake said vehicle, a plural position manual switch connected to said plurality of engine brakes to activate said engine brakes, said warning light system comprising:
   at least three warning lights;
   said engine brakes being rear, center and front engine brakes;
   said plural position manual switch having three settings to activate said engine brakes; and
   connecting means for connecting said at least three warning lights to said plurality of engine brakes, wherein when said engine brakes are activated, said warning lights are lit such that a first position of said plural position manual switch activates said center engine brake and one of said warning lights, a second position of said plural position manual switch activates said rear engine brake and said front engine brake and activates a second and third warning light, said third position of said plural position manual switch activating rear, center and front engine brakes and activating said at least three warning lights.

2. A warning light system according to claim 1, wherein two of said warning lights are red lights and one of said warning lights is an amber light.

3. A warning light system according to claim 1, wherein said connecting means further comprises fusible links.

* * * * *